United States Patent

Hoshina et al.

[11] Patent Number: 5,955,216
[45] Date of Patent: Sep. 21, 1999

[54] SEALED ALKALINE STORAGE BATTERY

[75] Inventors: Yasuko Hoshina, Hirakata; Yohei Hattori, Fujisawa; Noboru Ito, Toyohashi; Nobuyasu Morishita, Toyohashi; Munehisa Ikoma, Toyohashi, all of Japan

[73] Assignee: Matsushita Electric Industrial Co., Ltd., Osaka-Fu, Japan

[21] Appl. No.: 08/935,725

[22] Filed: Sep. 23, 1997

[30] Foreign Application Priority Data

Sep. 26, 1996 [JP] Japan ................................. 8-254628

[51] Int. Cl.⁶ .................................................... H01M 2/16

[52] U.S. Cl. ........................... 429/144; 429/206; 429/247

[58] Field of Search ..................................... 429/206, 144, 429/247, 145

[56] References Cited

U.S. PATENT DOCUMENTS

| | | | |
|---|---|---|---|
| 4,378,414 | 3/1983 | Furukawa et al. | 429/144 |
| 5,609,947 | 3/1997 | Kamei et al. | 429/247 X |
| 5,609,976 | 3/1997 | Ueda et al. | 429/206 X |

FOREIGN PATENT DOCUMENTS

| | | |
|---|---|---|
| 6-020673 | 1/1994 | Japan . |
| 8-111232 | 4/1996 | Japan . |

*Primary Examiner*—John S. Maples
*Attorney, Agent, or Firm*—Panitch Schwarze Jacobs & Nadel, PC

[57] ABSTRACT

A sealed alkaline storage battery of the present invention employs a non-woven fabric having a double-layer structure of a dense and sparse layers as a separator to separate a positive electrode from a negative electrode, the sparse layer facing the negative electrode and being lower than the dense layer in fiber density.

3 Claims, 1 Drawing Sheet

SEALED ALKALINE STORAGE BATTERY

BACKGROUND OF THE INVENTION

The present invention relates to a sealed alkaline storage battery having an electrode group, and more particularly to an improvement of separators used therein.

Heretofore, a sealed alkaline storage battery has adopted the Neumann effect to suppress an increase in an internal pressure of the battery. According to this effect, oxygen gas generated at positive electrodes in overcharging is absorbed at negative electrodes. However, if an oxygen gas absorption efficiency of the negative electrodes is low, the internal pressure of the battery increases gradually. Such an increase in internal pressure leads to breakdown or shortened life of the battery. Therefore, investigations have been made in various ways to improve the oxygen absorption efficiency of the negative electrodes.

For example, Japanese Laid-Open Patent Publication Hei 6-20673 proposes a method in which water repellency is imparted to a separator on the surface facing a positive electrode. But, this method adds a step of giving the water repellency to the separator. Therefore, a process to produce a battery is complicated and a production cost must be increased. Another problem is that giving the water repellency reduces an amount of an electrolyte which contacts with the electrode, leading to a decrease in discharge characteristics of the battery, especially high-rate discharge characteristics.

Further, Japanese Laid-Open Patent Publication Hei 8-111232 proposes a separator in which density of the inner layer is lower than that of the outer layers. However, such separator provides a decrease in oxygen gas absorption capacity of a negative electrode since the electrolyte reserved on the surface of the negative electrode becomes relatively large and the area in contact with oxygen gas becomes small.

BRIEF SUMMARY OF THE INVENTION

The object of the present invention is to solve the above-mentioned problem, and to improve an oxygen gas absorption capacity of a negative electrode while suppressing an increase in battery internal pressure, thereby to provide a sealed alkaline storage battery with a long cycle life and excellent discharge characteristics.

The present invention provides a sealed alkaline storage battery comprising: an electrode group including positive electrodes and negative electrodes piled alternately, and separators interposed therebetween; a battery case which accommodates the electrode group, wherein the separators are made of non-woven fabric and have a double-layer structure of a dense layer facing the positive electrode and a sparse layer facing the negative electrode, the sparse layer being lower than the dense layer in fiber density.

The present invention further provides a sealed alkaline storage battery: an electrode group including positive electrodes and negative electrodes piled alternately, and separators interposed therebetween; a battery case which accommodates the electrode group, wherein the fiber density of the separator is gradually reduced from a surface facing the positive electrode to another surface facing the negative electrode.

It is preferable that the fiber density of the separator is reduced continuously.

Such configuration of the separator realizes a smooth and efficient absorption of oxygen gas by the negative electrode.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
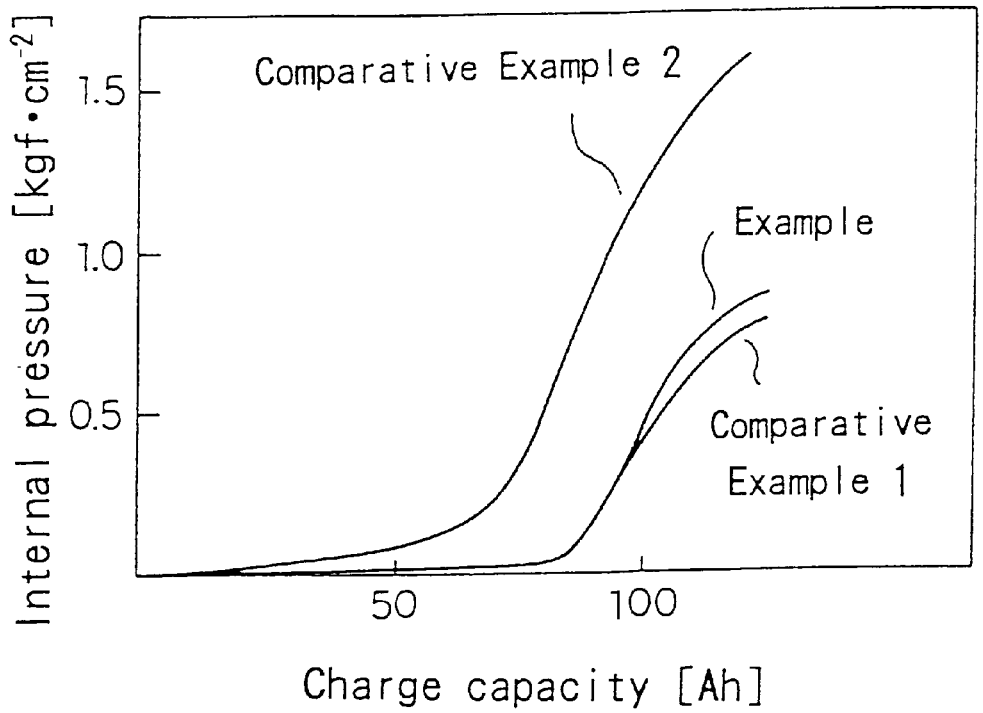
FIG. 1 indicates a characteristic diagram showing changes in internal pressure in charging of sealed alkaline storage batteries of example and the comparative examples.

The present invention realizes a sealed alkaline storage battery having a long cycle life and excellent discharge characteristics by using separators having a dense layer and a sparse layer, and disposing them with the sparse layer facing the negative electrode. It is also possible to obtain the same effect by decreasing the fiber density gradually from the surface facing the positive electrode to the other surface facing the negative electrode.

As a preferred embodiment of the present invention, in a case of using separators with a double-layer structure are applied in a sealed alkaline storage battery is hereinafter described in detail.

EXAMPLE

A non-woven fabric made of polypropylene fiber of 20–40 $\mu$m in mean filament diameter with a basis weight of 33 g/m$^2$ and a nominal thickness of 0.1 mm, and another non-woven fabric made of the same polypropylene fiber with a basis weight of 45 g/m$^2$ and a nominal thickness of 0.1 mm were prepared. These non-woven fabrics were dipped in a concentrated sulfuric acid for sulfonation. Then these were piled and integrally combined each other to produce a separator with a basis weight of 78 g/m$^2$ and a thickness of 0.2 mm.

A positive electrode was prepared as follows. First, a paste containing a nickel hydroxide active material and cobalt oxide as main components was prepared. This paste was filled on a foamed nickel plate as a core and dried. Then the foamed nickel plate was pressed and cut into the predetermined size thereby to produce a positive electrode.

A negative electrode was prepared as follows. First, a hydrogen storage alloy powder having a composition of $MmNi_{3.7}Al_{0.3}Mm_{0.4}CO_{0.6}$ (Mm : misch metal) was kneaded into a paste with a styrene-butadiene rubber and an aqueous solution of carboxymethylcellulose. The paste was applied on a punched metal sheet and dried. Then the punched metal sheet was pressed and then cut into the specified size thereby to produce a negative electrode. The positive electrodes and the negative electrodes were alternately laminated with the above-mentioned separator interposed therebetween thereby to produce an electrode group. The electrode group was then accommodated in a battery case, thereby to obtain a sealed nickel-metal hydroxide storage battery with a nominal battery capacity of 100 Ah. There, the separator was so arranged that the sparse side thereof provided with the non-woven fabric at 33 g/m$^2$ faced the negative electrode.

Comparative Example 1

As a comparative example, a nickel-metal hydroxide storage battery was constructed using the following separator in the same way as in Example.

A non-woven fabric made of the same polypropylene fiber as in Example with a basis weight of 76 g/m² and a nominal thickness of 0.2 mm was dipped in a solution of a silicone oil dissolved in a chlorofluorocarbon solvent for adding a water repellency. Also, another piece of the same non-woven fabric was sulfonated as in Example. Then these two non-woven fabrics were piled and integrally combined each other to produce a separator. Using thus obtained separators, a nickel-metal hydroxide storage battery was assembled in the same way as in Example. In this case, however, the separator was so arranged that the water-repellent finished side thereof faced the negative electrode.

Comparative Example 2

A non-woven fabric made of the same polypropylene fiber as in Example with a basis weight of 76 g/m² and a nominal thickness of 0.2 mm was subjected to a jet of a high-pressure water stream to increase the fiber density at each surface and then sulfonated as in Example.

A sealed nickel-metal hydroxide battery was made using thus obtained separators in the same way as in Example.

Changes in discharge characteristics and internal pressures of the sealed nickel-metal hydroxide batteries of Example and the comparative examples were examined in the following manner.

1. Discharge capacity

A standard capacity is the one obtained by discharging at a current of 0.2 CmA until the terminal voltage dropped to 1 V after charging at 0.11 CmA up to a charge depth of 110%. The discharge capacity was determined by discharging at a high rate of 1 CmA after charging under the same condition as in the measurement of the standard capacity. The results are shown in Table 1.

TABLE 1

|  | Example | Comparative Example 1 | Comparative Example 2 |
| --- | --- | --- | --- |
| Standard capacity (Ah) | 94 | 94 | 94 |
| Discharge capacity at one-hour rate (Ah) | 91 | 87 | 91 |

Table 1 shows that the battery of Example is equal to the batteries of Comparative Examples 1 and 2 in reference capacity. In view of high-rate discharge characteristics at 1 CmA, however, the battery of Example is better than the battery of Comparative Example 1 where the water-repellency was given on the separator surface facing the negative electrode, and is almost the same as the battery of Comparative Example 2 where the fiber density on the separator surfaces was increased.

2. Internal pressure of battery

The internal pressure of the battery was measured during charging at 0.3 CmA up to a charge depth of 90% at an ambient temperature of 45° C.

The results are illustrated in FIG. 1.

As indicated in FIG. 1, an increase in internal pressure of the battery of Example can be decreased lower than that of Comparative Example 2 and to about the same level as that of Comparative Example 1.

As shown, the battery of Example shows a smaller increase in internal pressure and excellent high-rate discharge characteristics. That is attributable as follows. Because fiber density on the separator surface facing the negative electrode is sparse, oxygen gas generated at the positive electrode moves freely, reaching the negative electrode more easily than in the battery of Comparative Example 2. Also, since the separator is hydrophilic, there is no possibility of the high-rate discharge characteristics being affected due to shortage in electrolyte on the surface of the negative electrode unlike in the battery of Comparative Example 1.

Generally, it is necessary to increase the fiber density of the separator with the reduction in the thickness in order to prevent short circuit and maintain the electrolyte. Reversely, thicker separators have to be reduced in fiber density to prevent the inter-electrode resistance from rising.

The weight per unit area on the sparse side of the separator which faces the negative electrode is chosen in consideration of smooth migration of oxygen gas generated at the positive electrode and maintenance of the electrolyte. Those factors are related to a wettability of the fiber, the diameter of the filament and also the thickness of the fabrics used. Therefore these can not be defined unilaterally. However, in a case of using a polypropylene non-woven fabric with a mean filament diameter of 20 to 40 μm that was used in the above-mentioned embodiment, the basis weight i.e. weight per unit area should be preferably within a range given in w [g/m²] of the following formula. In the formula, t denotes the thickness [mm] and d the specific gravity [g/cm³] of the fabrics.

$$\frac{100t}{t + \frac{1}{d \times 10}} \leq 2w \leq \frac{119t}{t + \frac{1}{d \times 10}}$$

The basis weight of the fabric on the dense side which faces the positive electrode also has to be chosen with the wettability of the fiber, the filament diameter and also the thickness the same way as on the sparse side layer. In the dense side fabric, furthermore, consideration has to be paid to the required mechanical strength of the separator. In a case of using a polypropylene non-woven fabric with a mean fiber diameter of 20 to 40 μm that was used in the above-mentioned embodiment, the basis weight should be preferably within the range given in w [g/m²] of the following formula. In the formula, t denotes the thickness [mm] and d the specific gravity [g/cm³] of fiber.

$$\frac{119t}{t + \frac{1}{d \times 10}} < 2w \leq \frac{138t}{t + \frac{1}{d \times 10}}$$

Figure 2:
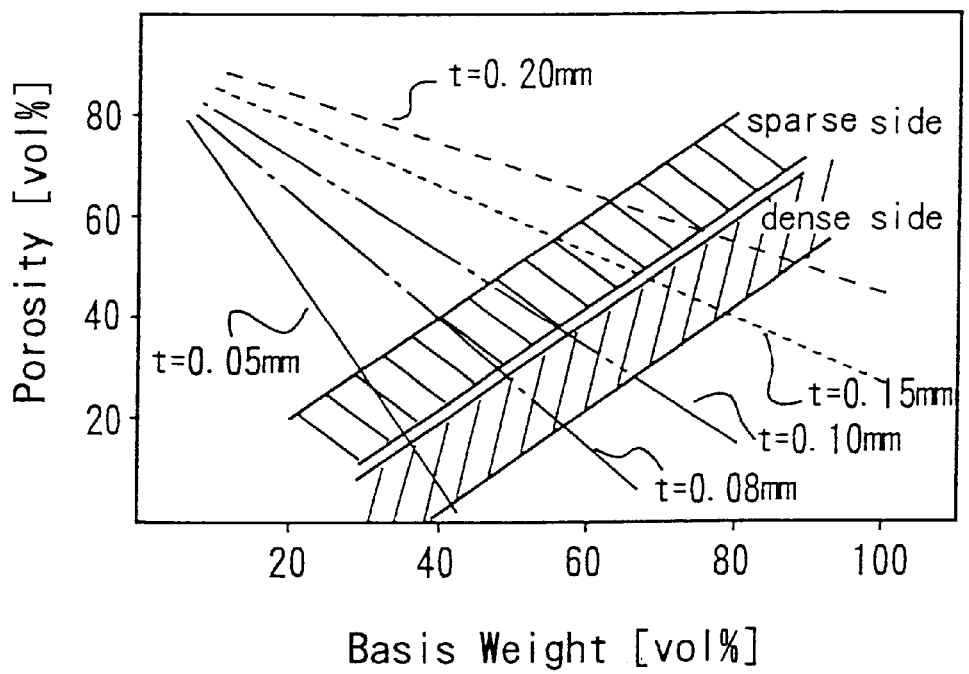
FIG. 2 indicates a characteristic diagram showing a relationship between preferred weights per unit area and percentage openings of non-woven fabrics used as separators of a sealed alkaline storage batteries.

With those expressed in percentage openings, that is the volume ratio of the openings, the sparse and dense sides should be preferably within the scopes of the shaded areas indicated in FIG. 2.

In the above-mentioned embodiment, the separator is made in a dual structure of a sparse layer with a low fiber density and a dense layer with a high fiber density, but it is also all right if the fiber density is gradually decreased, preferably in continuous manner, from a surface facing a positive electrode to another surface facing a negative electrode.

According to the present invention, oxygen gas generated at the positive electrode can be absorbed at the negative electrode smoothly and efficiently, and thus an increase in internal pressure can be suppressed. Thereby enabling to provide a sealed alkaline storage battery having a long life and excellent discharge characteristics.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. A sealed alkaline storage battery comprising: an electrode group including positive electrodes and negative electrodes piled alternately, and separators interposed therebetween; a battery case which accommodates said electrode group, wherein said separators are made of non-woven fabric having a dense layer and a sparse layer, said dense layer facing the positive electrode, said sparse layer facing the negative electrode, and said sparse layer being lower than said dense layer in fiber density.

2. A sealed alkaline storage battery comprising: an electrode group including positive electrodes and negative electrodes piled alternately, and separators interposed therebetween; a battery case which accommodates said electrode group, wherein the fiber density of said separator is gradually reduced from a first surface of the separator to a second surface of the separator, the first surface of the separator facing said positive electrode and the second surface facing said negative electrode.

3. The sealed alkaline storage battery in accordance with claim 2, wherein said fiber density of said separator is reduced continuously.

* * * * *